3,178,428
MAKING SULFENAMIDES FROM MORPHOLINES

Charles M. Eaker and Chester D. Trivette, Jr., St. Albans, and Robert L. Wright, Nitro, W. Va., assignors to Monsanto Company, a corporation of Delaware
No Drawing. Filed Nov. 17, 1961, Ser. No. 153,223
6 Claims. (Cl. 260—247.1)

The present invention relates to the manufacture of sulfenamides and more particularly to the manufacture of 2-(morpholinothio)benzothiazole and 2-(dimethylmorpholinothio)benzothiazole.

It is an object of the present invention to avoid the large excess of amine heretofore necessary for obtaining sulfenamides in satisfactory yield directly from morpholines. It is known that mercaptobenzothiazole and morpholine condense in aqueous medium in the presence of an oxidizing agent to form the sulfenamide but reasonably complete reaction requires from 400 to 700% excess of morpholine. The recovery of morpholine is troublesome, expensive and time-consuming but morpholine is too expensive a reactant to discard the large excess required for condensation. There has been a need for methods to reduce or eliminate morpholine recovery.

In accordance with this invention, an aqueous medium containing mercaptobenzothiazole or 2,2'-dithiobis(benzothiazole) and substantially the calculated theoretical quantity but not more than about 50% molar excess of morpholine or dimethylmorpholine is heated at a temperature within the range of 70–90° C. sufficient to keep the sulfenamide product molten while effecting oxidative condensation. Among useful oxidizing agents are sodium hypochlorite, sodium hypoiodide, sodium hypobromide, hydrogen peroxide, potassium persulfate, chlorine, bromine, iodine and potassium ferricyanide. In some instances it is desirable to add sodium sulfate prior to the oxidizing agent. Other alkali metal salts may be substituted although sodium sulfate is in general preferred. Suitable salts comprise trisodium phosphate, disodium hydrogen phosphate, potassium chloride, sodium chloride, sodium sulfate, and potassium sulfate. In place of morpholine, 2,6-dimethylmorpholine and 3,5-dimethylmorpholine may be substituted with essentially equivalent results.

Although in the case of one sulfenamide melting at about the boiling point of water some advantages have been reported from producing it at 50–65° C., sulfenamides are usually prepared at lower temperatures. Sulfenamides to which the process of this invention is directed are water insoluble solids at ordinary temperatures. When prepared in aqueous medium they are customarily formed at temperatures below the crystallizing point so that the solid product is formed directly in the aqueous medium. To maintain the product in molten condition would be expected to be detrimental. The products are relatively unstable substances as evidenced by the fact that deterioration in storage has been a vexing problem. However, it was discovered that reacting at temperatures where the product remained in liquid condition, permitted drastic reduction in the morpholine charged and produced high quality material in excellent yield. Possibly the liquid condition during formation results in more complete removal of impurities. The invention will be more readily understandable from the detailed examples which illustrate the best methods for carrying out the process.

Example 1

Into a suitable reactor equipped with agitator, temperature recorder, cooling system, heating system and feed line is charged 68.6 parts by weight (0.206 mole) of technical 2,2'-dithiobis benzothiazole, 59.9 parts by weight of sodium sulfate and 165 parts by weight of water. This mixture is agitated while adding 52.2 parts by weight (0.598 mole) of morpholine over a 15 minute period. The temperature is adjusted to 45° C. and maintained at 45–50° C. for one hour. The batch temperature is then raised to 76° C. and sodium hypochlorite solution (15 grams per 100 ml.) added slowly until a positive test is obtained on potassium iodide starch paper. The test should persist for a half hour to insure complete reaction. Approximately 221.8 parts by weight (0.37 mole) of the sodium hypochlorite solution will usually be required. The addition may be completed in approximately 90 minutes while maintaining the reaction mixture at 76–80° C. Following completion of the reaction, the reaction mixture is cooled and the resulting solid granular product washed with water and dried. Alternatively, a variety of procedures for recovering, washing and drying arylenethiazole sulfenamides are disclosed in the technical and patent literature and any of them may be used in connection with the process of this invention. For example, the molten sulfenamide may be drawn off from the reaction vessel and the wet molten product fed into a steam-jacketed tubular bowl centrifugal separator operated above the melting point of the sulfenamide and atmospheric pressure. A 96% yield of 2-(morpholinothio)benzothiazole of high quality is obtained.

Example 2

Into the reactor described in Example 1 is charged 143 parts by weight of water, 64.2 parts by weight of solid mercaptobenzothiazole (.384 mole) and 57.6 parts by weight of sodium chloride. External heat is then applied while 48.6 parts by weight of 2,6-dimethylmorpholine (.422 mole) is fed in over one-half hour. The temperature of the reaction mixture is then adjusted to 80–85° C. and 309.6 parts by weight of 12% aqueous sodium hypochlorite fed in over one and one-half hours. Efficient agitation is maintained throughout the addition. When the addition of sodium hypochlorite is complete, the reaction mixture shows a positive test to starch-iodide test paper acidified with 1–3 aqueous acetic acid which persists 30 minutes. The reaction mixture is then cooled while stirring is continued. The solid granular product is collected by filtration, washed with water to remove soluble salts and other impurities and dried. A 96.6% yield of 2-(2,6-dimethylmorpholinothio)benzothiazole of high quality is obtained.

Temperatures higher than 85° C. may cause some darkening of 2-(2,6-dimethylmorpholinothio)benzothiazole and slightly reduced yield. Operation at temperatures lower than 80° C. may lead to solidification of the product in the reaction vessel and incomplete oxidation. Increasing the excess amine to 20, 30, 40 and 50% respectively gives increasingly higher yields up to 40% excess although the differences are small. Addition of sodium chloride increases yields which yields increase with increasing amount of sodium chloride charged. On the other hand, a yield above 90% is obtainable without sodium chloride as illustrated by the following example.

Example 3

Into the reactor described in Example 1 is charged 108 parts by weight of wet solid mercaptobenzothiazole equivalent to 0.53 molecular proportions, 100 parts by weight of water and 63.5 parts by weight (0.55 mole) of 2,6-dimethylmorpholine. External heat is then applied and 357 parts by weight of aqueous sodium hypochlorite containing 13.55 grams of sodium hypochlorite per 100 ml. was fed in over one hour at a temperature of 89–91° C. The reaction product may be isolated as described in Example 2. The average yield from five preparations made in the manner described was 92%.

The actual bringing together of the reactants and allied materials may be conducted in any of various ways although it is preferred gradually to add the oxidizing agent to a mixture of other reactants in aqueous medium. A yield of 96.9% was obtained in carrying out the oxidative condensation of mercaptobenzothiazole and morpholine by adding concurrently a slurry of 0.5 mole of mercaptobenzothiazole in water and a solution of sodium hypochlorite in water to a mixture of 75 parts sodium sulfate and 0.725 mole of morpholine in water. The temperature was maintained sufficiently high to keep the product molten during the reaction. Where desired it is feasible to charge the thiazole reactant in slight excess and for some purposes this may be preferable. The products of this invention are valuable for accelerating the vulcanization of rubber and for some accelerating purposes product containing up to about 15% 2,2'-dithiobis(benzothiazole) is desirable. Such product can be made directly by the process of this invention.

It is intended to cover all changes and modifications of the examples of the invention herein chosen for purposes of disclosure which do not constitute departures from the spirit and scope of the invention.

What is claimed is:

1. The process which comprises oxidizing in aqueous medium a member of the group consisting of free mercaptobenzothiazole and 2,2'-dithiobis(benzothiazole) and substantially the theoretical quantity calculated for the corresponding sulfenamide but not more than about 50% molar excess of a member of the group consisting of morpholine and dimethylmorpholine at a temperature within the range of 70–90° C. sufficient to keep the corresponding sulfenamide molten and recovering the sulfenamide from the reaction mixture.

2. The process which comprises oxidizing in aqueous medium a member of the group consisting of free mercaptobenzothiazole and 2,2'-dithiobis(benzothiazole) and substantially the theoretical quantity calculated for 2 - (2,6 - dimethylmorpholinothio)benzothiazole but not more than about 50% molar excess of 2,6-dimethylmorpholine at a temperature within the range of 70–90° C. sufficient to keep the 2-(2,6-dimethylmorpholinothio)benzothiazole molten.

3. In the process which comprises oxidizing with aqueous sodium hypochlorite a member of the group consisting of free mercaptobenzothiazole and 2,2'-dithiobis(benzothiazole) and a member of the group consisting of morpholine and dimethylmorpholine to the corresponding sulfenamide in aqueous medium having dissolved therein prior to the addition of the sodium hypochlorite a member selected from the group consisting of potassium sulfate, sodium sulfate, trisodium phosphate, disodium hydrogen phosphate, potassium chloride, and sodium chloride, the improvement which comprises adding said sodium hypochlorite to the said aqueous medium containing substantially the theoretical quantity but not more thna about 50% molar excess of said member selected from morpholine and dimethylmorpholine while heating the reaction mixture at a temperature within the range of 70–90° C. sufficient to keep said sulfenamide molten.

4. The process of claim 3 in which the alkali metal salt is sodium sulfate.

5. In the process which comprises oxidizing with aqueous sodium hypochlorite 2,2'-dithiobis(benzothiazole) and morpholine to the corresponding sulfenamide in aqueous medium having sodium sulfate dissolved therein prior to the addition of sodium hypochlorite, the improvement which comprises adding the said sodium hypochlorite to the said aqueous medium containing substantially the theoretical quantity but not more than about 50% molar excess of said morpholine at a temperature within the range of 70–80° C. sufficient to keep 2-(morpholinothio)benzothiazole molten.

6. In the process which comprises oxidizing with aqueous sodium hypochlorite, free mercaptobenzothiazole and 2,6-dimethylmorpholine in aqueous medium having sodium chloride dissolved therein prior to addition of sodium hypochlorite, the improvement which comprises adding the said sodium hypochlorite to the said aqueous medium containing substantially the theoretical quantity but not more than about 50% molar excess of 2,6-dimethylmorpholine at a temperature within the range of 80–85° C. sufficient to keep 2-(2,6-dimethylmorpholinothio)benzothiazole molten.

References Cited in the file of this patent
UNITED STATES PATENTS

| | | |
|---|---|---|
| 2,045,888 | Tschunkur et al. | June 30, 1936 |
| 2,271,834 | Carr | Feb. 3, 1942 |
| 2,758,995 | Sullivan | Aug. 14, 1956 |
| 2,871,239 | D'Amico | Jan. 27, 1959 |

FOREIGN PATENTS

| | | |
|---|---|---|
| 841,419 | Great Britain | July 13, 1960 |